Dec. 3, 1929.                F. BACH                1,738,092
                         AUTOMOBILE LIGHT
                        Filed Oct. 12, 1928
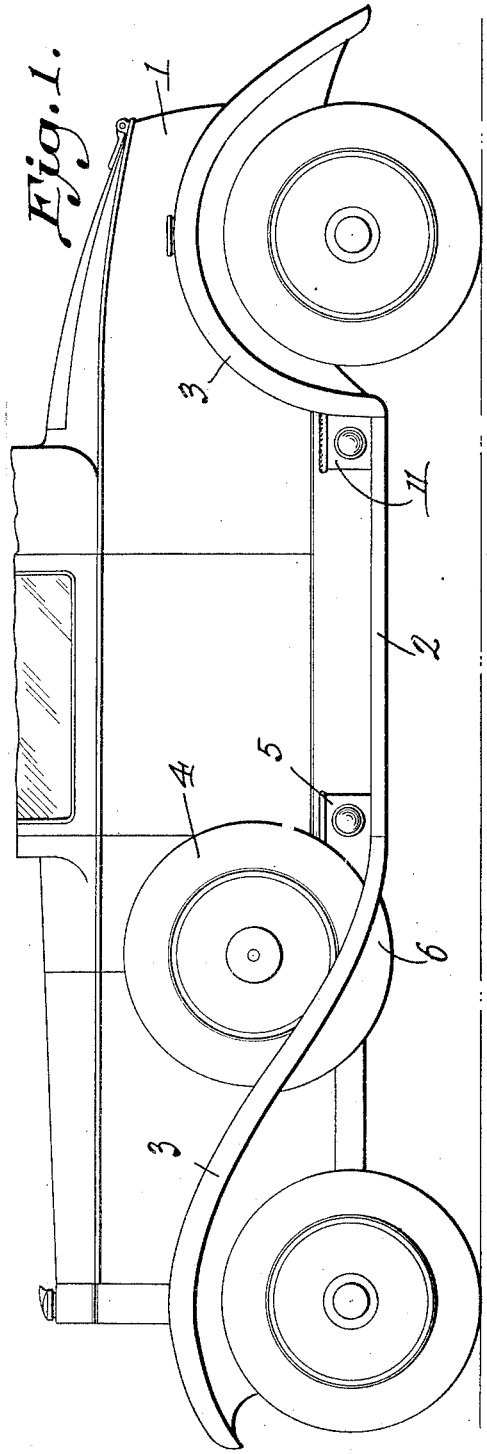
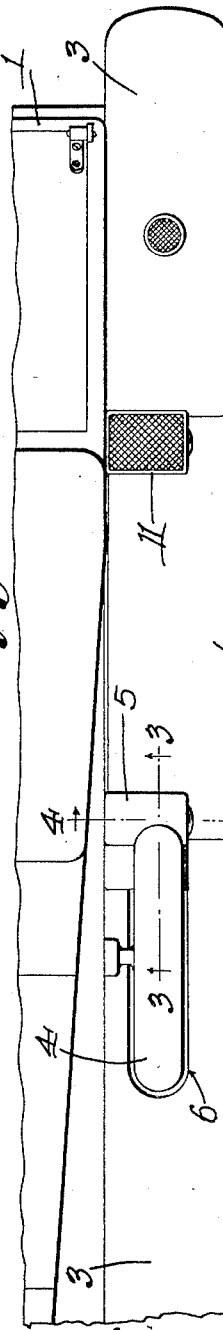
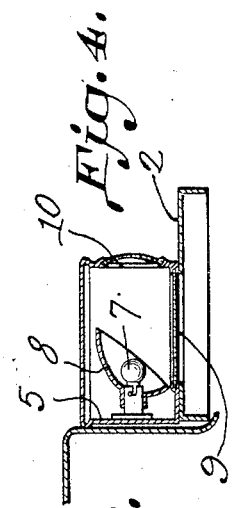
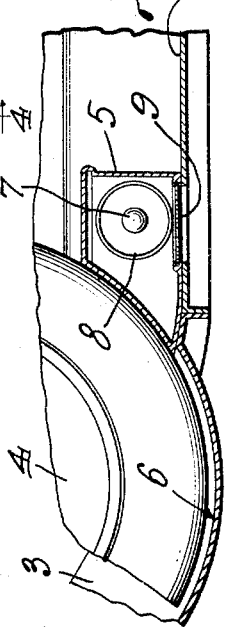
Felix Bach Inventor
By CA Snow & Co.
Attorneys.

Patented Dec. 3, 1929

1,738,092

UNITED STATES PATENT OFFICE

FELIX BACH, OF GREENSBURG, PENNSYLVANIA

AUTOMOBILE LIGHT

Application filed October 12, 1928. Serial No. 312,105.

This invention relates to a light designed primarily for use on automobiles whereby it becomes possible to illuminate the ground directly under the vehicle and at the same time direct light rays laterally from the left side of the vehicle so that the path of an approaching vehicle will thus be illuminated and it will be possible for both drivers to see the wheels of the approaching vehicle.

A further object is to provide a device of this type which has a housing that can be utilized as a step and will in no sense detract from the appearance of the vehicle.

Another object is to provide a device of this character which is simple and compact and can either be built on to a standard vehicle or can be attached thereto as an accessory.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of a portion of an automobile having the present improvement combined therewith.

Figure 2 is a plan view of one side portion of the vehicle showing the present improvement.

Figure 3 is a section on line 3—3, Figure 2.

Figure 4 is a section on line 4—4, Figure 2.

Referring to the figures by characters of reference, 1 designates the body of an automobile provided with the usual running board 2 and fenders 3. In the structure illustrated a spare wheel shown at 4 is mounted in the front fender and close to the side of the body.

Mounted on the running board 2 adjacent the front end thereof is a housing 5 which cooperates with the pocket 6 in the forward fender 3 to assist in holding the spare wheel 4 in place. This housing contains an electric lamp 7 back of which is arranged a reflector 8 so shaped as to direct light rays downwardly within the housing and also laterally. An opening 9 is formed in the bottom of the housing and in the running board 2 through which the rays from the lamp can be directed on to the ground between the wheels of the vehicle so that the driver of a vehicle approaching will thus be enabled to see the wheels and avoid them. Another opening 10 is formed in the side of the housing through which laterally directed rays from the lamp will be projected transversely from the left side of the vehicle, thereby to illuminate the path of an approaching vehicle and enable the driver to evade said vehicle. Both of the openings 9 and 10 are closed by suitable lenses.

It is to be understood that the lamp 7 is not to be lighted except when a vehicle is approaching along a road which is not illuminated. In other words the lamp can be controlled by a suitable switch located at a convenient point.

Instead of arranging the housing upon the front portion of the running board, it can be located on the rear portion thereof as shown at 11, the housing, when thus positioned, serving, if desired, as a step whereby access may be had readily to a rumble seat if the same is used as a part of the vehicle. Under some conditions both of these housings can be used, both of them being illuminated simultaneously.

What is claimed is:

The combination with a motor vehicle having a running board, of a step supported by and above the running board, said step including a housing the top of which constitutes a tread, there being a light outlet in the bottom of the housing opening through the running board and a light outlet in the outer side of the housing, and a lamp in the housing for directing light rays through both outlets.

In testimony that I claim the foregoing as my own, I have hereto affixed my signature.

FELIX BACH.